US010313330B2

(12) United States Patent
Chebbi et al.

(10) Patent No.: US 10,313,330 B2
(45) Date of Patent: *Jun. 4, 2019

(54) MOBILE BASED MULTI-CHANNEL CITIZEN ACCOUNT ORIGINATION IN DIGITAL ECONOMY

(71) Applicant: International Business Machines Corporation, Armonk, NY (US)

(72) Inventors: Ajay Chebbi, Bangalore (IN); Girish Dhanakshirur, Bangalore (IN); Chethan Kumar N. Settipalli, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/846,340

(22) Filed: Dec. 19, 2017

(65) Prior Publication Data
US 2018/0109513 A1    Apr. 19, 2018

Related U.S. Application Data

(63) Continuation of application No. 14/855,412, filed on Sep. 16, 2015, now Pat. No. 9,935,941.

(51) Int. Cl.
*H04L 29/06* (2006.01)
*G06Q 30/00* (2012.01)
(Continued)

(52) U.S. Cl.
CPC .......... *H04L 63/083* (2013.01); *G06Q 10/10* (2013.01); *G06Q 30/00* (2013.01); *H04L 63/102* (2013.01);
(Continued)

(58) Field of Classification Search
CPC ..... H04L 63/08; H04L 63/083; H04L 63/102; H04L 63/18; H04L 9/3223; H04L 9/3236;
(Continued)

(56) References Cited

U.S. PATENT DOCUMENTS 7,366,702 B2 *   4/2008   David ................... G06F 21/33
                                                       235/380
7,707,120 B2 *   4/2010   Dominguez ........... G06Q 20/02
                                                       705/30

(Continued)

FOREIGN PATENT DOCUMENTS

CN            101523413 A         9/2009

OTHER PUBLICATIONS

IBM, List of IBM Patents or Patent Applications Treated as Related, Appendix P, dated Dec. 23, 2017, 2 pages.
(Continued)

*Primary Examiner* — Hosuk Song
(74) *Attorney, Agent, or Firm* — Patricia B. Feighan

(57) ABSTRACT

Gathering and verifying customer information via SMS and in-person representatives. A hash is received with customer account information from a business correspondent application, wherein the account information is given in-person to a business correspondent, the business correspondent enters the account information into the business correspondent app, the account information is verified by the business correspondent after entering the account information in the business correspondent app, and the hash is generated by the business correspondent app after the business correspondent app receives confirmation of verification of the account information from the business correspondent. An account number is generated for the customer. The account number is sent to the business correspondent app and to the customer. An enrollment PIN is sent to the customer, wherein
(Continued)

the enrollment PIN is linked to the account number. The business correspondent app is synced after the business correspondent app receives the enrollment PIN from the customer.

8 Claims, 4 Drawing Sheets

(51) Int. Cl.
   *H04W 12/06* (2009.01)
   *H04W 12/08* (2009.01)
   *G06Q 10/10* (2012.01)
(52) U.S. Cl.
   CPC ............ *H04L 63/18* (2013.01); *H04W 12/06* (2013.01); *H04W 12/08* (2013.01)
(58) Field of Classification Search
   CPC ....... G06F 21/31; H04W 12/06; H04W 12/08; G06Q 30/00
   USPC ..... 726/2–7; 713/168, 181, 184; 705/50, 67, 705/75
   See application file for complete search history.

(56) References Cited

U.S. PATENT DOCUMENTS

| | | | |
|---|---|---|---|
| 8,060,915 B2 * | 11/2011 | Voice | ...................... G06F 21/34 709/225 |
| 8,176,327 B2 | 5/2012 | Xiong et al. | |
| 8,249,965 B2 | 8/2012 | Tumminaro | |
| 8,290,876 B1 * | 10/2012 | Powell | ................... G06Q 20/10 705/64 |
| 8,510,819 B2 | 8/2013 | Saunders et al. | |
| 8,600,355 B1 | 12/2013 | Sadhvani et al. | |
| 8,613,065 B2 * | 12/2013 | Hird | ........................ G06F 21/31 713/159 |
| 8,655,782 B2 | 2/2014 | Poon et al. | |
| 8,738,527 B2 | 5/2014 | Kalinichenko et al. | |
| 8,938,793 B2 | 1/2015 | Ausems et al. | |
| 9,264,461 B1 | 2/2016 | Van de Wetering | |
| 9,935,941 B2 * | 4/2018 | Chebbi | ................. H04L 63/083 |
| 2010/0057560 A1 | 3/2010 | Skudlark et al. | |
| 2013/0160104 A1 | 6/2013 | Carlson | |
| 2014/0037184 A1 | 2/2014 | Gorski et al. | |
| 2014/0201102 A1 | 7/2014 | Srinivasan et al. | |
| 2015/0040001 A1 | 2/2015 | Kannan et al. | |
| 2015/0143106 A1 | 5/2015 | Wentker et al. | |
| 2017/0078264 A1 | 3/2017 | Chebbi et al. | |
| 2018/0109512 A1 | 4/2018 | Chebbi et al. | |

OTHER PUBLICATIONS

Pending U.S. Appl. No. 15/846,332, filed Dec. 19, 2017, entitled: "Mobile Based Multi-Channel Citizen Account Origination in Digital Economy ", 18 pages.

* cited by examiner

MOBILE BASED MULTI-CHANNEL CITIZEN ACCOUNT ORIGINATION IN DIGITAL ECONOMY

BACKGROUND

The present invention relates generally to the field of customer account information, and more particularly to the gathering and verifying customer information via SMS and in-person representatives.

Many financial institutions and government agencies are implementing aid programs to citizens. Some programs include, for example, financial inclusion, subsidies and benefit programs. These programs may be tasked with transmitting personal information via paper forms or electronically; however, the gathering of information is subject to the possibility of inaccuracies. Some inaccuracies may be computer error, while others may be human error. Furthermore, citizens in rural areas without internet connection may complicate the data collection and accuracy.

SUMMARY

Embodiments of the present invention disclose a method, computer program product, and system for gathering and verifying customer information via SMS and in-person representatives. A hash is received with customer account information from a business correspondent application, wherein the customer account information is given in-person to a business correspondent, the business correspondent enters the customer account information into the business correspondent app, the customer account information is verified by the business correspondent after entering the customer account information in the business correspondent app, and the hash is generated by the business correspondent app after the business correspondent app receives confirmation of verification of the customer account information from the business correspondent. An account number is generated for the customer. The account number is sent to the business correspondent app and to the customer. An enrollment PIN is sent to the customer, wherein the enrollment PIN is linked to the account number. The business correspondent app is synced after the business correspondent app receives the enrollment PIN from the customer.

BRIEF DESCRIPTION OF THE DRAWINGS

Novel characteristics of the invention are set forth in the appended claims. The invention will best be understood by reference to the following detailed description of the invention when read in conjunction with the accompanying figures, wherein like reference numerals indicate like components, in which:

DETAILED DESCRIPTION

The present invention may be a system, a method, and/or a computer program product. The computer program product may include a computer readable storage medium (or media) having computer readable program instructions thereon for causing a processor to carry out aspects of the present invention.

Figure 1:
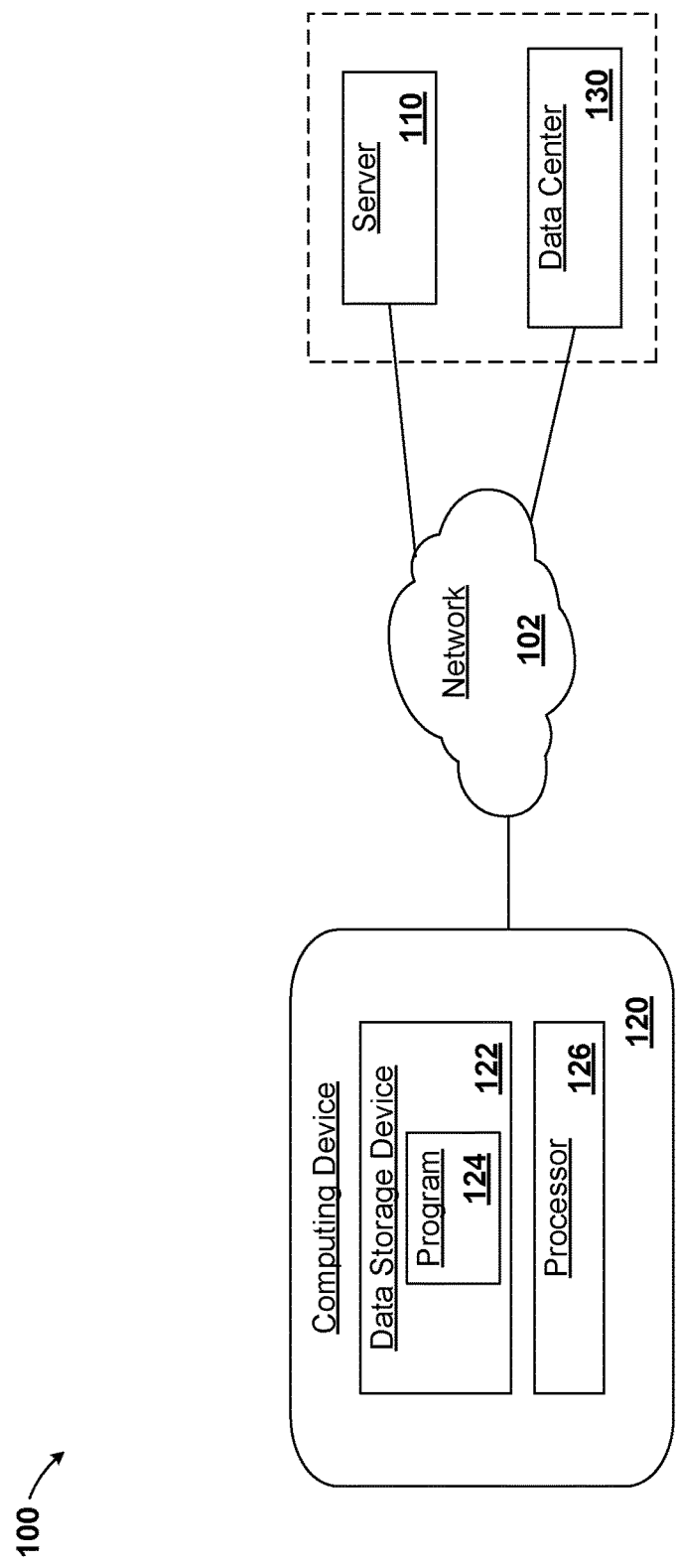
FIG. 1 illustrates networked computer environment, according to an embodiment.

The present invention will now be described in detail with reference to the Figures. Referring now to FIG. 1, a computer network environment 100 that supports mobile communication devices and other network elements is illustrated. The computer network environment 100 may include a plurality of computing devices 120, servers 110 and/or data centers 130, only one embodiment of which is shown. The computer network environment 100 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The computing device 120 may communicate with the server 110 and/or the data center 130 via the communications network 102. The communications network 102 may include connections, such as wire, wireless communication links, or fiber optic cables. Computing device 120 may be, for example, a mobile device, a telephone, a personal digital assistant, a netbook, a laptop computer, a tablet computer, a desktop computer, or any type of computing devices capable of running a program and accessing a network. The computing device 120 has a processor 126 and a data storage device 122 that is enabled to run a software program 124.

Server 110 may be a laptop computer, tablet computer, netbook computer, personal computer (PC), a desktop computer, a personal digital assistant (PDA), a smart phone, a SMS capable phone, or any programmable electronic device capable of communicating with computing device 120 and data center 130 via network 102. It should be noted; the server 110 may be a remote server or may be within the premises of the data center 130 (signified by the dotted line). Additionally, the data center 130 may have data storage devices, programs, and processors to support the computing device 120.

Figure 2:
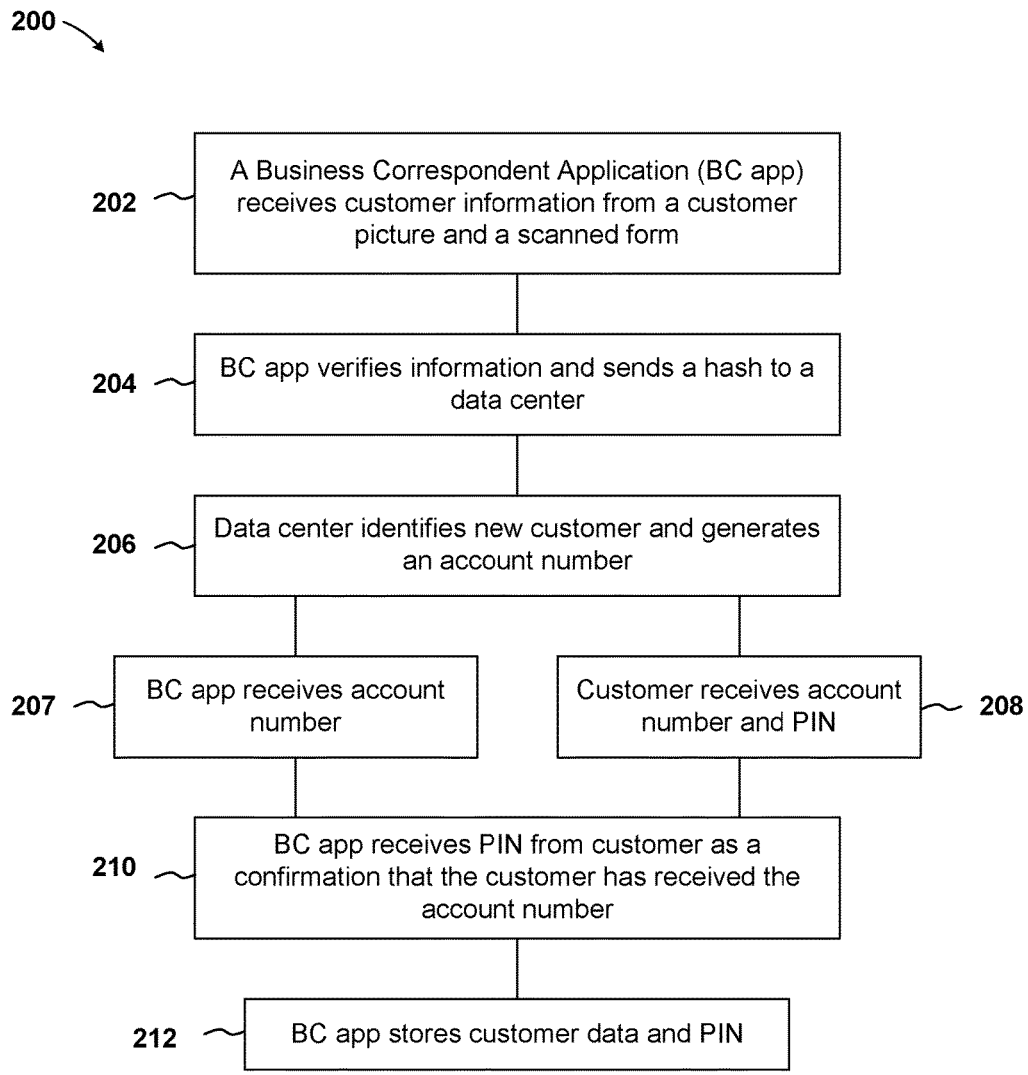
FIG. 2 illustrates an operational flowchart depicting the steps carried out by a program for gathering and verifying customer information via SMS and in-person representatives, according to an embodiment.

Referring now to FIG. 2, an operational flowchart 200 depicts steps carried out by a program (e.g., program 124 described with reference to FIG. 1) to acquire and verify customer information. More specifically, a business correspondent application (BC app) scans a customer form and an account is created and verified.

In an embodiment, the focus may be directed to customers in rural areas where internet access is sparse. Rural customers generally fill out paper forms or applications and deliver that paper to the required location by mail or in-person. When a paper form is filled out, handwriting may be illegible and is open to human error when entering the information and creating an account. The problem gets amplified when inclusion programs that involve form fillings are incorporated to all citizens of a country, as large as, for example, India. One possible verification method may include having the customer deliver the form in-person, however, it may be difficult and discouraging to require rural customers to travel long distances when transportation may be unavailable. A business correspondent (BC) can go to the rural towns and villages to acquire forms and information. The BC can be in possession of a mobile device or computing device equipped with the BC app to acquire and verify the customer's information.

First, the BC can travel to the rural area with the mobile device equipped with the BC app. The customer can have a specific form for a specific purpose already filled out or the BC can bring the form with him or her. One example of a form to be filled out may be a blank application (e.g., form 16 in India). The BC app can be preprogrammed to recognize the form to be input and predetermine necessary requirements. For example, a picture may be required along with the information on a form; the BC's mobile device may be equipped with a camera for taking a picture of the customer as well as scanning the form filled out by the customer (Step 202). The BC app may be preprogrammed to capture certain information from the form, for example, a customer's attributes (e.g., name, phone number, government ID number, time, latitude/longitude and nearest recognizable address). To minimize data storage on the mobile device, the BC app can scan the form, recognize the type of form, recognize the required customer attributes and only save images of the required data. This can minimize the image size of the scanned form by eliminating such fields as customer instructions.

Once the BC app acquires the required information, the BC app may allow the BC to verify the captured information with the customer as a first level of verification. Once the information is verified with the customer, the BC app can create a hash including the relevant customer information. The BC app then sends the hash to a data center via SMS or other transmission methods (Step 204).

The data center may have a program to determine who the customer is, for example, a returning customer or new customer. The data center then generates the appropriate account, for example, a new account for a new customer (Step 206).

Once the account is created by the data center, the account number is sent to the BC app (Step 207) and to the customer via SMS, if available. The customer will also receive an enrollment PIN number connected to the account (Step 208).

Verification of receipt of the account number by the customer may be performed by receiving the PIN number from the customer. The BC app then confirms the PIN number connected to the account number (Step 210).

The BC app stores the customer data and confirmation PIN (Step 212).

Figure 3:
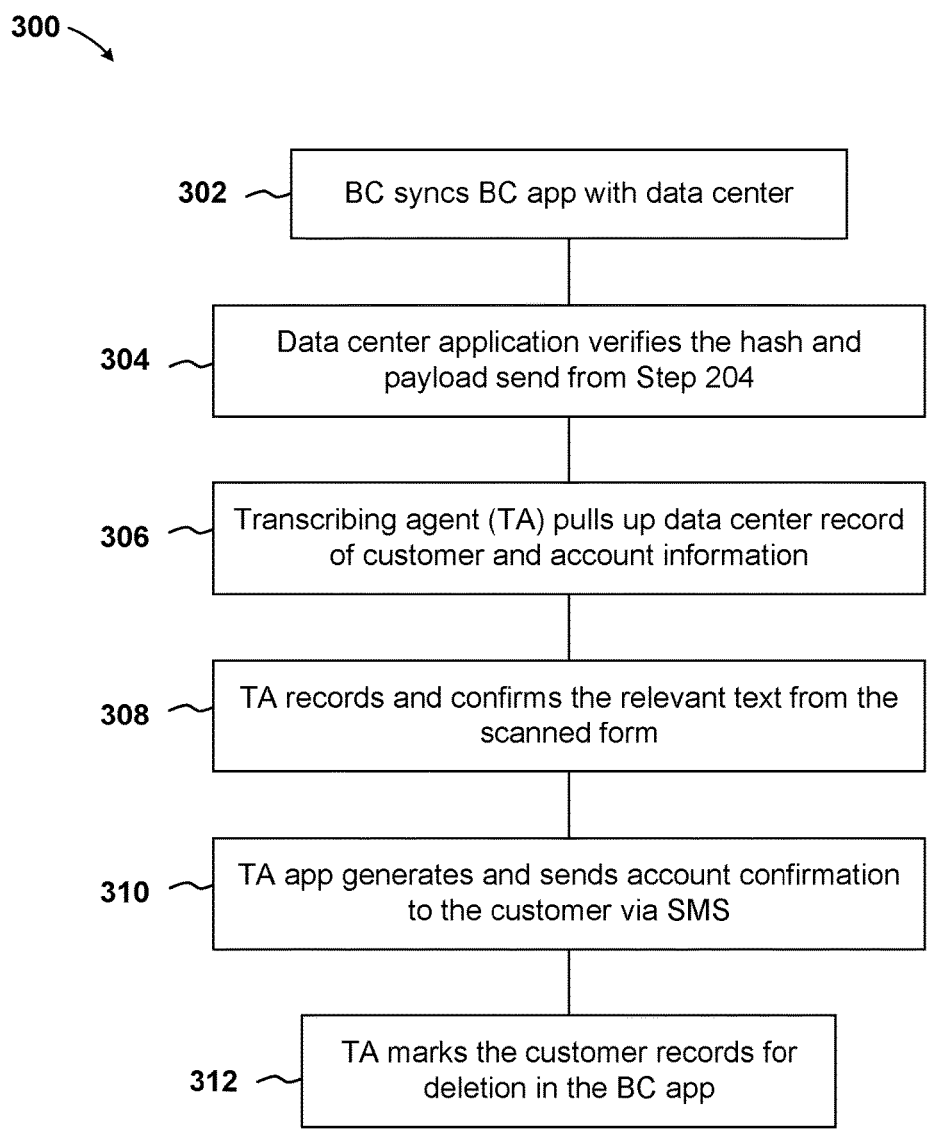
FIG. 3 illustrates an operational flowchart depicting the steps carried out at a data center for gathering and verifying customer information via SMS and in-person representatives, according to an embodiment.

Referring now to FIG. 3, an operational flowchart 300 depicts steps carried out by the data center once the BC returns to the data center.

The BC returns to the data center with the mobile device and BC app. The BC app is synced with the data center database. The information synced between the BC app and data center includes the hash, the customer information (i.e., customer attributes) and any verification SMS's sent and received (Step 302). The information may be synced via corporate wifi, hardwire, or any other data transmission method known in the art.

As another layer of verification, the hash and customer information (sent from step 204) may be verified by the data center (Step 304). After the information is verified by the data center, a transcribing agent (TA) pulls up the data center customer records and account information (Step 306). The TA records and confirms the required and/or non-mandatory fields of entry (Step 308). TA app generates and sends account confirmation to the customer via SMS (Step 310). Once the account confirmation is sent, the TA can mark the customer record for deletion on the BC app to free up storage space on the computing device (Step 312).

Figure 4:
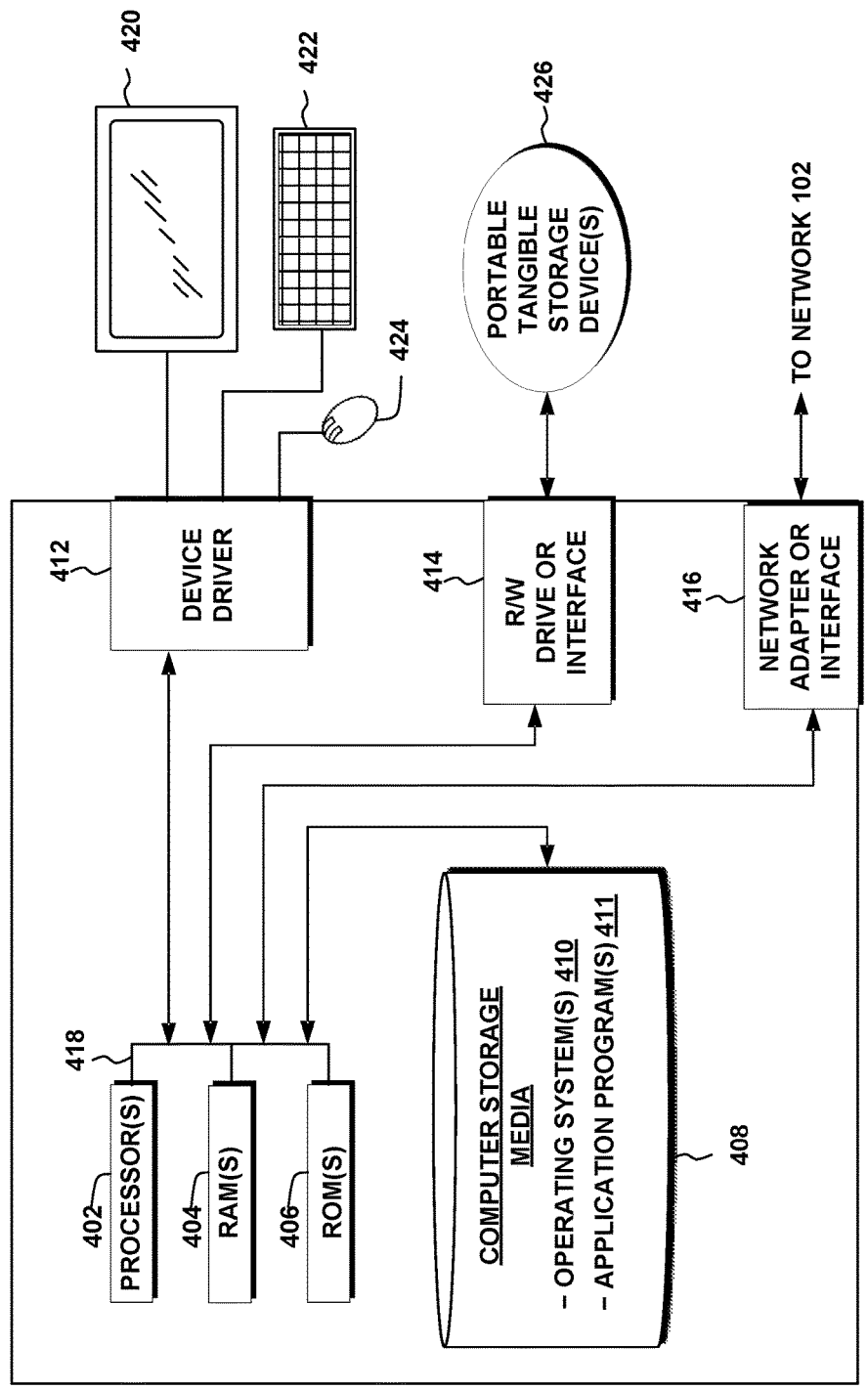
FIG. 4 illustrates a block diagram of components of a computing device and server, according to an embodiment.

Referring now to FIG. 4, a block diagram of components of the computing device 120 (described in reference to FIG. 1) is provided, according to an embodiment of the present invention. It should be appreciated that FIG. 4 provides only an illustration of one implementation and does not imply any limitations with regard to the environments in which different embodiments may be implemented. Many modifications to the depicted environment may be made.

The computing device 120 (described with reference to FIG. 1) may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, the program 124, may be stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing device 120 may also include an R/W drive or interface 414 to read from, and write to, one or more portable computer readable storage media 426. Application program 411 on the computing device 120 may be stored on one or more of the portable computer readable storage media 426, read via the respective R/W drive or interface 414 and loaded into the respective computer readable storage media 408.

The computing device 120 may also include a network adapter or interface 416, such as a TCP/IP adapter card or wireless communication adapter (such as a 4G wireless communication adapter using OFDMA technology). Application programs 411 may be downloaded from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

The computing device 120 may also include a display screen 420, a keyboard or keypad 422, and a computer mouse or touchpad 424. Device drivers 416 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for gathering and recording customer information by a data center, the system comprising:
one or more processors, one or more non-transitory computer readable storage media, and program instructions embodied on the one or more non-transitory computer readable storage media, the program instructions, when executed by the one or more processors, causing the one or more processors to perform a method comprising:
receiving a hash with customer account information from a business correspondent application, wherein the customer account information is given in-person to a business correspondent, the business correspondent enters the customer account information into the business correspondent app, the customer account information is verified by the business correspondent after entering the customer account information in the business correspondent app, and the hash is generated by the business correspondent app after the business correspondent app receives confirmation of verification of the customer account information from the business correspondent;

generating an account number for the customer;

sending the account number to the business correspondent app and to the customer;

sending an enrollment PIN to the customer, wherein the enrollment PIN is linked to the account number; and syncing with the business correspondent app after the business correspondent app receives the enrollment PIN from the customer.

2. The system of claim 1, wherein the business correspondent app sends a confirmation short message service (SMS) to the customer upon receiving the enrollment PIN from the customer.

3. The system of claim 1, wherein the data center sends the account number to the business correspondent app and the customer via short message service (SMS).

4. The system of claim 1, wherein the customer is identified as a new customer using the received hash and customer account information.

5. A computer program product for gathering and recording customer information by a data center, the computer program product comprising:

one or more non-transitory computer readable storage media, and program instructions embodied on the one or more non-transitory computer readable storage media, the program instructions, when executed by a computer, causing the computer to perform a method comprising:

receiving a hash with customer account information from a business correspondent application, wherein the customer account information is given in-person to a business correspondent, the business correspondent enters the customer account information into the business correspondent app, the customer account information is verified by the business correspondent after entering the customer account information in the business correspondent app, and the hash is generated by the business correspondent app after the business correspondent app receives confirmation of verification of the customer account information from the business correspondent;

generating an account number for the customer;

sending the account number to the business correspondent app and to the customer;

sending an enrollment PIN to the customer, wherein the enrollment PIN is linked to the account number; and syncing with the business correspondent app after the business correspondent app receives the enrollment PIN from the customer.

6. The computer program product of claim 5, wherein the business correspondent app sends a confirmation short message service (SMS) to the customer upon receiving the enrollment PIN from the customer.

7. The computer program product of claim 5, wherein the data center sends the account number to the business correspondent app and the customer via short message service (SMS).

8. The computer program product of claim 5, wherein the customer is identified as a new customer using the received hash and customer account information.

* * * * *